United States Patent [19]

Franklin et al.

[11] Patent Number: 4,827,624

[45] Date of Patent: May 9, 1989

[54] ELECTRONIC LEVEL

[75] Inventors: Robert C. Franklin; Charles J. Stauss, both of Los Gatos, Calif.

[73] Assignee: Zircon International, Inc., Campbell, Calif.

[21] Appl. No.: 79,368

[22] Filed: Jul. 30, 1987

[51] Int. Cl.⁴ .................................................. G01C 9/06
[52] U.S. Cl. ........................................ 33/366; 33/391; 33/396
[58] Field of Search .......................... 33/366, 391, 396; 340/689

[56] References Cited

U.S. PATENT DOCUMENTS

| | | |
|---|---|---|
| 3,371,424 | 3/1968 | Sweet . |
| 3,861,052 | 1/1975 | Siegfried . |
| 4,027,399 | 6/1977 | Armstrong . |
| 4,077,131 | 3/1978 | Erickson . |
| 4,079,521 | 3/1978 | Uhorczak . |
| 4,085,375 | 4/1978 | Galuschak et al. . |
| 4,094,073 | 6/1978 | Parra . |
| 4,110,609 | 8/1978 | Beer . |
| 4,154,000 | 5/1979 | Kramer . |
| 4,182,046 | 1/1980 | Ludlow et al. . |
| 4,346,363 | 8/1982 | Wilhelmson ........................ 340/964 |
| 4,467,527 | 8/1984 | North ................................... 33/366 |
| 4,571,844 | 2/1986 | Komasaku et al. ................. 33/366 |
| 4,592,147 | 6/1986 | Herman ............................... 33/366 |

Primary Examiner—Harry N. Haroian
Attorney, Agent, or Firm—Skjerven, Morrill, MacPherson, Franklin & Friel

[57] ABSTRACT

An electronic level for determining the angular orientation of a structure, where the error angle between actual and desired angular orientation of the structure is indicated by a variable signal perceptible to the user.

15 Claims, 4 Drawing Sheets

ELECTRONIC LEVEL

FIELD OF THE INVENTION

This invention relates to production of an audio signal and/or a visual signal that indicates whether a given structure has a predetermined angular orientation, and in particular to an electronic device for indicating the angular orientation of an object.

BACKGROUND OF THE INVENTION

Levels have been used for many years to determine the angular orientation in a vertical plane of a surface with the horizontal. Typical levels have an air bubble in a glass tube which lines up with specific marks on the tube when the level is horizontal or in the desired angular orientation. Herman, in U.S. Pat. No. 4,592,147, discloses an electronic level which uses a pendulum containing a thin wire with a weight on its distal end to determine the angular orientation of an object.

The '147 patent describes an electronic level which provides the user with a visual and audible means of indicating when a desired angle, such as horizontal, is reached. The angle detection means consists of a metal sphere suspended by a fine thread (called a "plumb line" by Herman). The thread interrupts a light beam when the desired angle is attained. Light which is provided from a source, such as an infrared LED, passes through a restricting aperture, enters the string pendulum area, then passes through another aperture, and finally is received by a phototransistor. Although this is a functional system, it does not permit tilting the level in a forward or backward direction by an acceptable amount without possibly disabling the pendulum action.

As used herein to describe the angular movement of the level, the term "rotation" pertains to the normal angular displacement of the level when determining a surface angle. The term "tilt" describes the rotation of the level from an end-on view. Furthermore, as used herein, the phrase "angular orientation" means angular orientation relative to horizontal of a line in a predetermined vertical plane. In the Herman patent, this line is defined by the weighted plumb line that hangs freely under gravity. The phrase "desired angular orientation", as used herein, means the direction, relative to horizontal in the predetermined vertical plane, that is desired for the level. The phrase "error angle" ($\theta$), as used herein, means the difference, expressed in degrees, between the actual angular orientation of a perpendicular to the surface being leveled, and the desired angular orientation of a vertical or plumb line in the predetermined vertical plane.

When using the Herman level, the structure to be oriented is positioned so that, when the predetermined desired angular orientation of the structure is attained, the plumb line either completely or maximally blocks the light path of a light beam that is directed from one side of the plumb line to the other side. When the plumb line does not completely block the light path, the unblocked light is received by a light receptor that is spaced apart from the source of the light beam. When the plumb line partially or completely blocks the light beam path, correspondingly less light is received by the light receptor. The weight (called a plumb bob by Herman) in the Herman device is constrained to move in a rather narrow channel. If the Herman device is tilted by too large an angle, of the order of five degrees, the plumb bob and the plumb line will bind against a wall of the device and not move freely. The Herman device provides visual and/or aural indication that the desired angular orientation has been achieved and that the actual angular orientation is within a predetermined error angle of the desired orientation. However, the Herman device provides no indication that the desired angular orientation is being approached, except for indicating that the plumb line orientation is within a predetermined error angle, typically 0.2°, of the desired angular orientation.

Other leveling devices that use a pendulum or similar approach include U.S. Pat. No. 3,233,235, issued to Wright, which uses a knife edge magnet to close an electric circuit when the desired angular orientation is achieved; and U.S. Pat. No. 4,094,073, issued to Parra, which provides for a weighted pendulum to achieve contact in an electric circuit when the desired angular orientation has been achieved. Other electronic leveling device disclosures include U.S. Pat. Nos. 3,371,424, 3,861,052, 4,027,399, 4,077,132, 4,079,521, 4,085,375, 4,110,609, 4,154,000 and 4,182,046 and Australian Pat. No. 17828/82 (lodged Aug. 19, 1983).

SUMMARY OF THE INVENTION

An object of the invention is to provide an electronic level that indicates visually and/or aurally that the angular orientation of a given structure coincides with a desired angular orientation of a structure, or that the structure's angular orientation is approaching the desired angular orientation.

Another object of the invention is to provide means for indicating the actual angular orientation of a structure in a vertical plane that allows substantial rotation of the structure in a vertical plane about a horizontal axis without producing misleading or inaccurate indicia.

Other objects of the invention, and advantages thereof, will become clear by reference to the detailed description and the accompanying drawings.

In accordance with this invention, a structure for achieving the foregoing and other objects of the invention is provided that comprises an electronic level comprising: light-producing means for producing light; light-responsive means, responsive to receipt of light, for producing a first electronic signal representing the amount of light from the light-producing means that strikes the light-responsive means; light-interrupting means capable of rotating about a first axis, for preventing at least a portion of the light produced by the light-producing means from striking the light-responsive means, with the light-interrupting means being arranged such that the amount of light from the light-producing means that strikes the light-responsive means is a measure of the error angle between a predetermined line on the light-interrupting means and a second predetermined line in a certain vertical plane; and signal means perceptible to a user and coupled to the light-responsive means for indicating by a variable signal the amplitude of the error angle.

Advantages of this invention over the prior art inventions include the following: (1) rotation of the light-interrupting means about a horizontal axis perpendicular to the axis of interest (called "tilt" herein) is suppressed or eliminated; (2) when the error angle is within a predetermined region of sensitivity, the invention indicates aurally and/or visually whether the error angle is decreasing or increasing in magnitude as the error angle varies; and (3) the upper and lower limits on the region of sensitivity are independently and easily adjustable.

DESCRIPTION OF A PREFERRED EMBODIMENT

Figure 1:
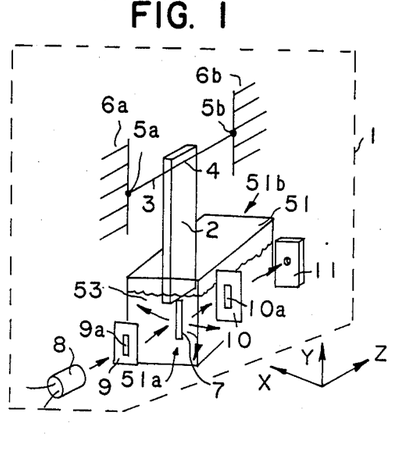
FIG. 1 is a schematic perspective view of the mechanical/optical components of the invention according to one embodiment that uses a wire or similar projection to partially or fully interrupt a light beam.
Figure 2A:
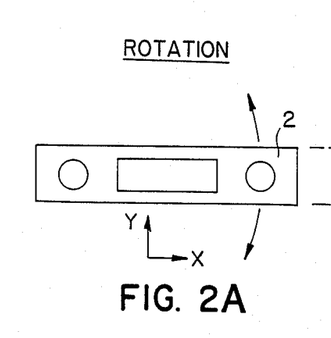
FIGS. 2A and 2B indicate, in a side view and an end view of a carpenter's level, the "rotation" of the level about the "z" axis and the "tilt" of the level about the "x" axis.
Figure 2B:
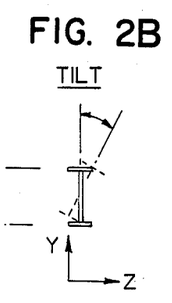
Figure 4:
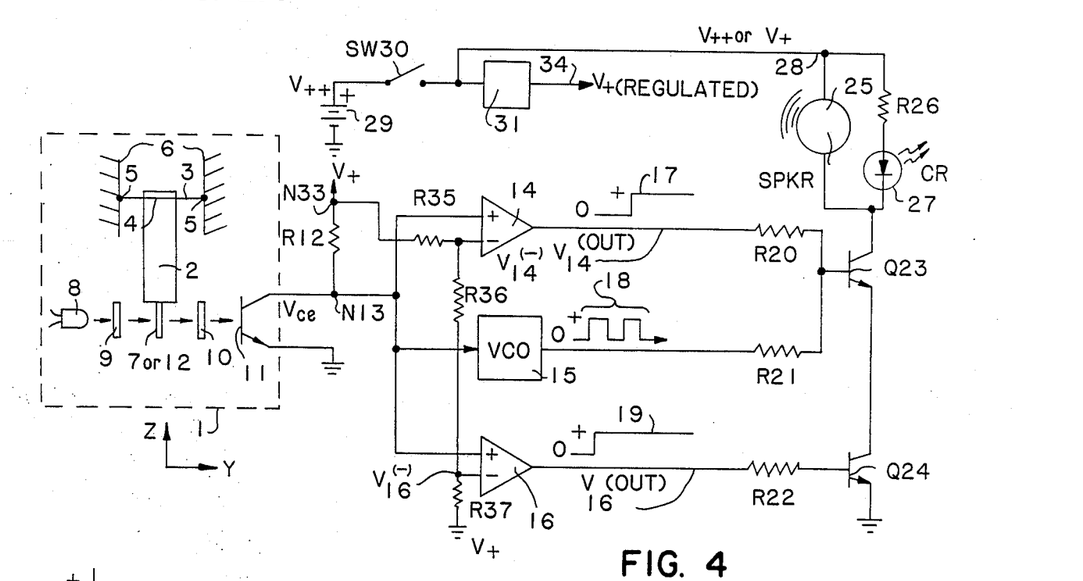
FIG. 4 is a schematic view of the embodiment of FIG. 1, showing the relationship of the mechanical/optical components of one embodiment of the invention to the electrical components of this embodiment.

The subject invention, as shown schematically in FIG. 1 in one embodiment, relies upon the tendency of a pendulum or other object 2 possessing a significant weight such as a bar, constrained to rotate about a fixed axis, to orient itself so that the potential energy of the weighted object 2 in the earth's gravitational field is a minimum. Here, the weight 2 has extending from one end a wire 7 or other projection of small but nonzero width; the wire 7 extends in a predetermined direction when the orientation of the weight 2, or of a structure associated with the weight, has achieved a predetermined, desired angular orientation in a vertical plane. The projection 7 and the weight or pendulum 2 are preferably made of nonmagnetic material such as brass, to avoid the adverse effects of the earth's magnetic field or a stray magnetic field associated with a conductor or with a magnet, on accuracy of orientation of the weight or pendulum 2 or the projection 7. In FIG. 1, the weight 2 and attached projection 7 are constrained to rotate together about the z-axis in the xy-plane as shown in FIGS. 1 and 2A, in response to a corresponding change in the angular orientation of the structure. It is desirable here that the weight 2 also be prevented from rotating about the x-axis in the yz-vertical plane as shown in FIGS. 1 and 2B; this rotation is referred to herein as "tilt". In FIG. 4, the x-axis is perpendicular to the yz-plane and points out of the paper.

Figure 7:
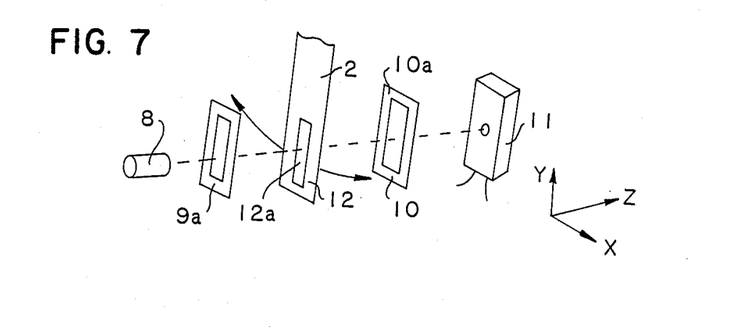
FIG. 7 is a schematic perspective view of an embodiment of the invention analogous to that of FIG. 1, where the wire or similar projection is replaced by a shutter or similar aperture.

Although the device in FIG. 1 operates with a wire 7 that is opaque to light, a shutter 12 or similar aperture as shown in FIG. 7 could replace the wire 7 so that maximum light falls on a phototransistor 11 when the error angle $\theta$ between the actual orientation of the thread and the desired orientation of the thread is either zero or less than some predetermined small angle $\theta_m$.

In accordance with our invention, we have devised a pendulum system as shown in one embodiment in FIG. 1. A pendulum or weight 2 is suspended on a taut thread 3 made of nylon or other suitable material that is attached at two points 5a and 5b to two spaced apart surfaces of the given structure whose angular orientation is to be monitored. The thread 3 fits into a slot or aperture 4 running the full width of the pendulum or weight 2 and is preferably held in place using a fastening agent such as epoxy. The fastening agent should be chosen so that it will not wick or otherwise migrate into the thread fibers in a manner that would interfere with the torsional freedom of the thread. Tilting the level, as previously defined, will now produce very little displacement of the wire 7 in the light path because the thread is held taut. A small displacement will occur, since the thread 3 has very small diameter and is typically made of a material such as nylon that does stretch a small amount. Initially, there was a concern about the torsional effects of mechanical shock which the pendulum would have on the thread. Calculations based on the center of mass of the pendulum and high "g" accelerations indicate that the stress on the thread is well below its tensile strength and sheer forces are negligible.

A small diameter wire or projection 7 (approximately 0.03 inches diameter) is attached at the bottom of the pendulum or body 2 so that this wire 7 is oriented in a particular direction in a vertical plane (e.g., the direction of a plumb line in that plane) when the structure to which the thread 3 is attached has attained the desired angular orientation.

Electromagnetic radiation, also referred to herein as "light", is produced by a radiation source 8, such as a light emitting diode ("LED"), and is passed through apertures 9a and 10a, respectively, in two substantially parallel plates 9 and 10 that are otherwise opaque to the light. Preferably, the projection 7 is positioned so that it rotates in an xy-plane lying generally between the plates 9 and 10. The apertures 9a and 10a are preferably elongated rectangles whose long sides define directions that are parallel to one another. The apertures 9a and 10a and the wire 7 are arranged so that, if the structure attains the desired angular orientation, the direction of the wire is parallel to the long sides of the rectangular apertures 9a and 10a, and the wire completely or maximally blocks the passage of any light from the source 8 that would otherwise pass from aperture 9a through aperture 10a. A phototransistor 11 is spaced apart from the radiation source 8 so that the apertures 9a and 10a lie between the radiation source 8 and the phototransistor 11; with the wire 7 removed or displaced, radiation from the source 8 will pass through aperture 9a, through aperture 10a and be received by the phototransistor 11. If the wire 7 partially or fully blocks the passage of radiation from aperture 9a through aperture 10a, proportionately less light will be received at the phototransistor 11. Typically, the distance from the source 8 to the phototransistor 11 may be as small as 0.125 inch, or even smaller, and the long dimensions of the apertures 9a and 10a are also typically 0.125 inch.

Figure 3:
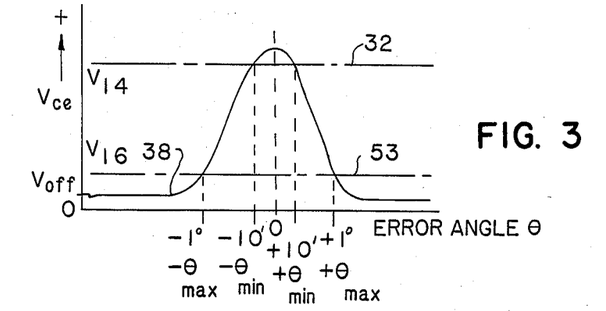
FIG. 3 is a graphic view of the voltage produced by a phototransistor used in one embodiment of the invention, as a function of error angle $\theta$ of the angular orientation of the structure.

When light falls on the phototransistor 11 current is produced within phototransistor 11 that is a measure of the intensity of light falling on the phototransistor 11. As more current is produced within the phototransistor 11, the phototransistor turns more and more "on," and the voltage or potential difference between the collector and emitter of the phototransistor 11 falls accordingly. As the error angle $\theta$ between the actual and desired angular orientations of the wire 7 decreases toward zero, the wire 7 blocks or intercepts more and more of the light that would otherwise fall on the phototransistor 11; and the collector-emitter voltage difference $V_{ce}$ of the phototransistor 11 varies with this error angle $\theta$ as shown in FIG. 3. This voltage difference $V_{ce}$ increases continuously and monotonically as the error angle $\theta$ tends to zero through positive or negative values, and $V_{ce}$ reaches a maximum value set by the construction of an associated voltage source $V_+$ when the error angle has decreased to zero. Stray light, even at zero error angle $\theta$, may cause a small collector current in the phototransistor 11, thus preventing the collector-emitter voltage $V_{ce}$ of the phototransistor 11 from reaching the maximum value determined by $V_+$. Where the wire 7 blocks no part of the light beam issuing from source 8 in FIG. 1, the voltage $V_{ce}$ reaches a minimum level, denoted $V_{off}$ in FIG. 3. For $V_{ce} < V_{16}$ in FIG. 3, the above-mentioned visual and aural signals are absent.

With reference to FIG. 4, the emitter terminal of the phototransistor 11 is grounded and the collector terminal is electrically coupled directly to the positive input terminals of two comparators 14 and 16 as shown. The collector terminal of phototransistor 11 is also electrically coupled across a resistor R12 to a substantially constant positive voltage source $V_+$. $V_+$ is coupled to ground through three resistors R35, R36 and R37 in series as shown. The resistors R35, R36 and R37 function as a voltage divider in a well known manner. A node between resistors R35 and R36 is electrically coupled to the negative input terminal of the comparator 14, and a node between resistors R36 and R37 is electrically coupled to the negative input terminal of the comparator 16; this provides substantially constant voltages to the negative input terminals of the comparators 14 and 16 in the following manner:

$$V_{14}^{(-)} = \frac{R_{36} + R_{37}}{R_{35} + R_{36} + R_{37}} V_+, \quad (1)$$

$$V_{16}^{(-)} = \frac{R_{37}}{R_{35} + R_{36} + R_{37}} V_+, \quad (2)$$

where $R_{35}$, $R_{36}$ and $R_{37}$ are the respective resistance values of the three resistors.

The output terminal of comparator 14 is electrically coupled through a resistor R20 to the base of an npn transistor Q23. The output terminal of comparator 16 is electrically coupled through a resistor R22 to the base of a second npn transistor Q24 whose emitter is grounded and whose collector is electrically coupled to the emitter of transistor Q23 as shown. The collector of the phototransistor 11 is also electrically coupled to the input terminal of a voltage-controlled oscillator ("VCO") 15, and the output terminal of VCO 15 is electrically coupled through a resistor R21 to the base of transistor Q23.

The collector of transistor Q23 is electrically coupled to the cathode of an LED 27 or other similar light-emitting device; and the anode of LED 27 is electrically coupled through a resistor R26 to the substantially constant positive voltage source $V_+$ or to an unregulated voltage source $V_{++}$ from which $V_+$ is derived. The collector of transistor Q23 is also electrically coupled to the low voltage terminal of a piezoelectric or similarly driven speaker 25 whose high voltage terminal is electrically coupled to the voltage source $V_+$ or $V_{++}$ as shown. Either the aural signal produced by the speaker 25 or the visual signal produced by the LED 27 may be, optionally, deleted.

One may take an unregulated voltage source $V_{++}$ and, in a well known manner, put the output voltage from this voltage source through a circuit containing an LM317 or other similar voltage regulator 31 to produce a regulated and substantially constant positive voltage $V_+$ at regulator terminal 34 as shown.

The operation of the network shown in FIG. 4 is as follows. Radiation falling on the phototransistor 11 produces a current that varies the voltage $V_{ce}$ according to error angle $\theta$ as shown in FIG. 3. Where the magnitude $\theta$ of the error angle is quite large so that the voltage $V_{ce}$ is less than $V_{16}$, the voltages at the negative input terminals of both of the comparators 14 and 16 dominate over the corresponding voltages at the positive terminals of 14 and 16 so that the voltage output of each of these comparators is low (negative or substantially zero), as shown in FIG. 3. At this point, transistors Q23 and Q24 are both cut off. As the electronic level is tipped so that the error angle magnitude $|\theta|$ decreases and the voltage $V_{ce}$ increases above $V_{16}$ (with $V_{16} < V_{ce} < V_{14}$), the output signal of comparator 16 abruptly becomes positive as shown in FIG. 5; this saturates transistor Q24 but leaves Q23 cut off. Up to the point where $V_{ce} = V_{16}$, no current has flowed through the LED 27 or speaker 25, and these devices remain off. As $V_{ce}$ increases further, the modulator frequency $f_{mod}$ of the oscillatory signal produced by the VCO 15 increases continuously with the voltage $V_{ce}$. Voltage $V_{ce}$ increasing with $V_{16} < V_{ce} < V_{14}$ corresponds to $\theta_{min} < |\theta| < \theta_{max}$ in FIGS. 3 and 6 with error angle magnitude $|\theta|$ decreasing; as $|\theta|$ decreases throughout this range, the invention produces an increasing modulation frequency $f_{mod}$ that indicates to the user that further movement in the same direction is required to reduce the error angle to zero. Here, $\theta_{min}$ and $\theta_{max}$ ($> \theta_{min}$) are two arbitrary but fixed sensitivity angles. When the error angle magnitude $|\theta|$ decreases below $\theta_{min}$, which may be $\approx 0.2°$, the light indicator signal and audio speaker signal will switch from modulated signals to continuous signals, thus indicating that the error angle is very small. The angle $\theta_{min}$ may be made arbitrarily small.

In the intermediate range, i.e., $V_{16} < V_{ce} < V_{14}$, the VCO 15 produces a sequence of approximately square wave pulses 18 of constant magnitude and variable frequency, where this frequency increases with $V_{ce}$; these positive pulses intermittently drive transistor Q23 on and off, with a frequency $f_{mod}$ corresponding to the frequency of the modulation signals produced by the VCO 15. With transistor Q23 temporarily driven on, the voltage at the collector terminal of Q23 (and, thus, at the cathode of LED 27 and at the low voltage terminal of speaker 25) is driven low (transistor Q24 is already saturated) so that the LED 27 intermittently lights up and the speaker 25 intermittently emits an audio sound; the LED signal and the speaker signal appear and disappear with a frequency that matches the current modulation frequency emitted by the VCO 15. As voltage $V_{ce}$ continues to increase, corresponding to the error angle magnitude $|\theta|$ tending to zero, the modulation frequency (on/off) of the audio signal from the speaker 25 and of the visual signal from the LED 27 increase correspondingly. When the error angle magnitude $|\theta|$ has decreased sufficiently that $V_{ce}$ is greater than $V_{14}$, the output of the comparator 14 abruptly goes positive (FIG. 5) and drives the transistor Q23 into a "permanently" saturated condition. At this point, the audio signal from the speaker 25 and the visual signal from the LED 27 become constant rather than intermittent; this is shown symbolically in FIG. 6 as $f_{mod}=f_{mod}(max)=$constant.

Figure 6:
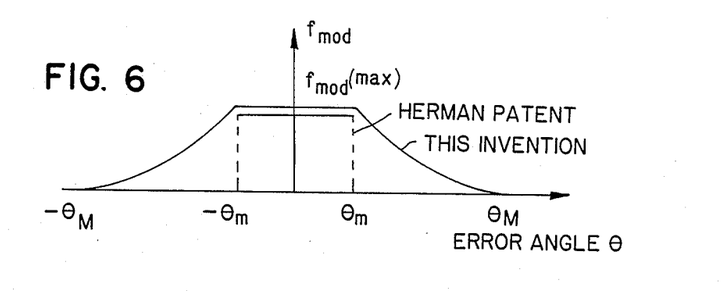
FIG. 6 is a graphic view of the modulation frequency $f_{mod}$ of the aural and visual signals produced by this invention and by the Herman device, as a function of error angle $\theta$ of angular orientation.

FIG. 6 compares the variation of modulation frequency $f_{mod}$ with error angle $\theta$ for this invention and for the Herman device. For this invention: (1) $f_{mod}$ is zero (no signals) for error angle magnitude $|\theta|>\theta_{max}$, where $\theta_{max}$ is an arbitrary but fixed maximum sensitivity angle; (2) $f_{mod}$ increases substantially monotonically (preferably, but not necessarily, linearly) to, say, $f_{mod}(max)$ as $|\theta|$ decreases from $\theta_{max}$ to $\theta_{min}$, and (3) $f_{mod}=$constant for $|\theta|<\theta_{min}$. The relationship $f_{mod}=$constant symbolizes receipt of a continuous rather than intermittent signal from speaker 25 and/or LED 27. The error angle $\theta_{min}<|\theta|<\theta_{max}$ is referred to herein as the sensitivity region and the error angle range $-\theta_{min}<\theta<\theta_{min}$ is referred to as the plateau region. Within the sensitivity region, $f_{mod}$ varies monotonically to indicate whether the error angle magnitude $|\theta|$ is increasing or decreasing as the device is tipped.

For the Herman device: (1) $f_{mod}=0$ for $|\theta|>\theta_{min}$; and (2) $f_{mod}=f_{mod}(max)$ for $|\theta|<\theta_{min}$. The devices discussed in the background section herein, such as the Herman patent, do not indicate, by means of a continuous and monotonically changing modulation frequency for the aural/visual signal, that the present angular orientation is approaching or moving away from the desired angular orientation. These prior art devices also do not prevent or suppress, as the present invention does, the development of a substantial "tilt" angle in the orientation of the weighted object/pendulum 2 or associated projection 7.

Figures 5A, 5B, 8, 9:
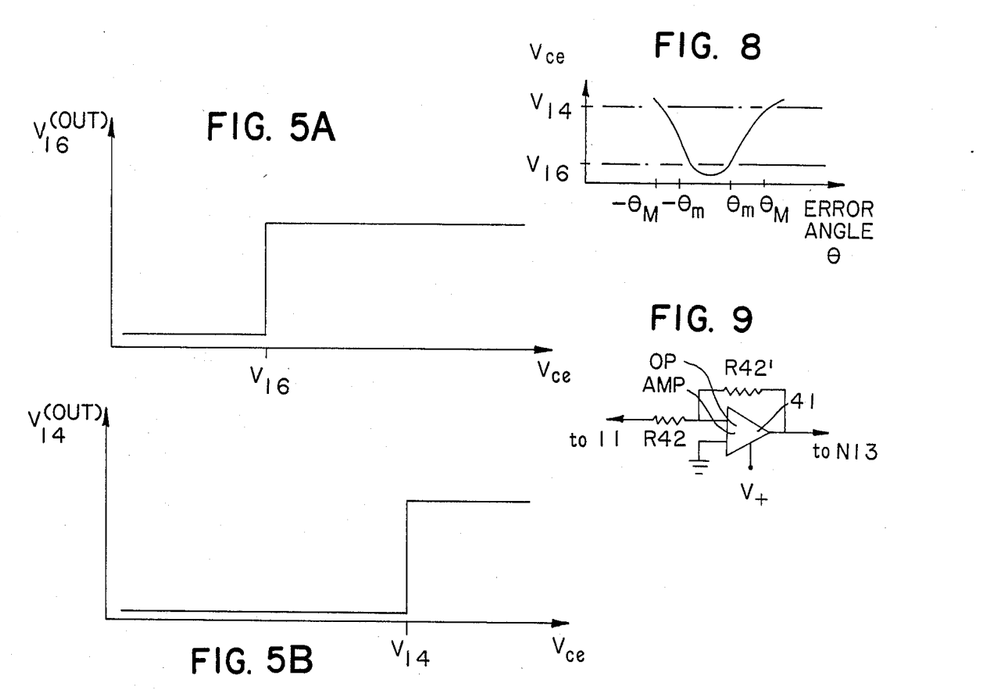
FIGS. 5A and 5B are graphic views of the output of each of the two comparators 14 and 16 in FIG. 4, as a function of the voltage $V_{ce}$ applied at the positive input terminal of each comparator.
FIG. 8 is a graphic view of the voltage produced by a phototransistor used in a second embodiment of the invention, as a function of error angle $\theta$ of the angular orientation of the structure.
FIG. 9 is a schematic view of an inverter circuit useful in an embodiment of the invention.

The wire or projection 7 in FIG. 1 may be replaced by a shutter 12 with an associated shutter aperture 12a as shown in FIG. 7. With the configuration of FIG. 7 adopted, the light produced by the light source 8 in FIG. 1 will pass through apertures 9a, 12a and 10a in that order, if the angular orientation is exactly or nearly equal to the desired angular orientation (error angle $\theta \approx 0$) so that these three apertures are substantially aligned. As the magnitude of the error angle $|\theta|$ increases, the shutter 12 rotates about the z-axis in the xy-plane in FIG. 7 so that a decreasing quantity of light from the source 8 passes through apertures 9a, 12a and 10a; and correspondingly less current is produced in the phototransistor 11. Here, the current-emitter voltage difference $V_{ce}$ varies with error angle $\theta$ substantially as shown in FIG. 8. With this arrangement substituted in FIG. 4 for the elements shown in FIG. 1, the modulation frequency $f_{mod}$ of the output signal from the VCO 15 will decrease as the error angle magnitude $|\theta|$ decreases. This will produce intermittent output aural signals from the speaker 25 and intermittent visual output signals from the LED 27 with decreasing modulation frequency $f_{mod}$ as $|\theta|$ decreases; and for $|\theta|<\theta_{min}$ the modulation will cease and the aural and visual signals will be absent.

Alternatively, one may interpose between the collector terminal of the phototransistor 11 and node N13 shown in FIG. 4 a simple inverter circuit that utilizes a high gain operational amplifier 41 and two substantially identical resistors R42 and R42' in the negative feedback circuit shown in FIG. 9. This will produce, again, the variation of voltage $V_{ce}$ with $\theta$ shown in FIG. 3, and all other responses will be substantially as they are for the use of a wire or projection 7 in FIG. 4.

FIG. 4 shows the phototransistor 11 and the transistors Q23 and Q24 as npn transistors. One may, by methods well known to those in the art, replace the two npn transistors Q23 and Q24 by two pnp transistors, replace the positive voltage source $V_{++}$ and the regulated positive voltage source $V_+$ by a negative voltage source $V_{--}$ and a regulated negative voltage source $V_-$, and modify the VCO 15, the speaker 25 and the LED 27; and the resulting configuration will again produce aural and/or visual signals that vary monotonically with the error angle magnitude $|\theta|$ to indicate whether $|\theta|$ is increasing or decreasing.

Figure 10:
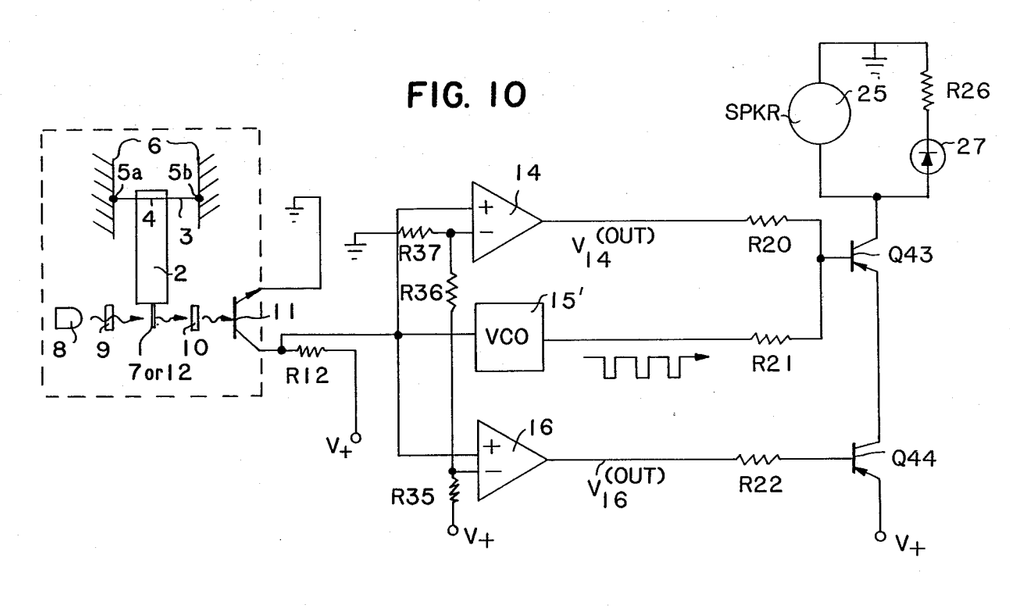
FIG. 10 is a schematic view, analogous to FIG. 4, of another embodiment of the invention.

The circuit shown in FIG. 10 also produces aural and/or visual signals that vary monotonically with the error angle magnitude $|\theta|$ in the same manner as in FIG. 1. In FIG. 10, the following changes have been made from FIG. 1: (1) replace the ground terminals shown at or adjacent to the emitter terminal of phototransistor 11, the emitter terminal of transistor Q24 and resistor R37 by the positive voltage terminal $V_+$ (or $V_{++}$); (2) replace the terminals of the positive voltage source $V_+$ (or $V_{++}$) at or adjacent to resistors R12, R35 and R26 and speaker 25 by grounds; (3) exchange resistors R35 and R37; (4) exchange the input and output terminals of the speaker 25; (5) exchange the input and output terminals of the LED 27; and (6) replace the two npn transistors Q23 and Q24 by two pnp transistors Q43 and Q44. Analysis of the circuit shown in FIG. 10 proceeds in the same manner as analysis of the circuit of FIG. 1, and the result is the same.

If, in FIG. 10, the positive voltage sources $V_+$ (or $V_{++}$) are replaced by negative voltage sources $V_-$ (or $V_{--}$) and the VCO 15, speaker 25 and LED 27 are modified according to considerations well known in the art, and if the two pnp transistors are replaced by two npn transistors Q23 and Q24, the resulting configuration will again produce aural and/or visual signals that vary monotonically with the error angle magnitude $|\theta|$ to indicate whether $|\theta|$ is increasing or decreasing.

One may, optionally, include a switch SW30 positioned between the static voltage source $V_{++}$ and the voltage regulator 31 in FIG. 4 to allow the device to be activated and deactivated at will.

With reference to the voltage divider (comprising R35, R36 and R37) set forth above, one or more of the resistors R35, R36 and R37 may optionally be replaced by a potentiometer of suitable resistance range to allow the voltage levels $V_{14}$ and $V_{16}$ shown in FIG. 4 to be varied or controlled. This allows one to vary the error angle magnitude $\theta_{max}$ at which the audio and visual signals appear intermittently (with monotonically changing frequency); and it allows one to vary the error angle magnitude $\theta_{min}$ below which the audio and visual signals become substantially constant. As noted above, for $|\theta|>\theta_{max}$ the aural and visual signals from speaker 25 and LED 27, respectively, are absent in the first embodiment.

The electronic leveling invention disclosed herein offers several advantages over earlier approaches for level indicators: (1) the effect of "tilt" on operation of the device is suppressed or eliminated; (2) the error angle $\theta$ associated with the angular orientation of the structure and capable of being detected electronically is not limited to merely a fraction of a degree or a few degrees; (3) the error angle limits for the region of sensitivity and for the plateau region, respectively, in FIG. 3, are independently and easily adjustable; and (4) for the error angle $\theta$ in the range $-\theta_{max} \leqq \theta \leqq -\theta_{min}$ or $\theta_{min} \leqq \theta \leqq \theta_{max}$, the invention indicates aurally or visually or both whether one is approaching or moving away from the desired angular orientation (defined by error angle $\theta=0$). The invention may be used to indicate the error in angular orientation of a structure in a predetermined vertical plane; and by a change in the mechanical components with respect to which the angular orientation is defined the angular orientation of a structure in another plane, such as a horizontal plane, may also be indicated.

As a further improvement (optional), the mechanical optical components of the invention shown in FIGS. 1 and 7 may include a container 61 containing a viscous fluid 63, such as transformer oil or Shellsol No. 72 (an aliphatic thinner) that is substantially transparent to light of a predetermined wavelength $\lambda_s$, that surrounds part or all of the pendulum or weight 2 and/or the wire 7 (or shutter 12), with the container 61 either: (1) lying wholly between the plates 9 and 10 so that the light from the source 8 passes through aperture 9a, a first wall 61a of the container 61, a second wall 61b of the container 61, and aperture 10a in that order; (2) including one or both of the plates 9 and 10 as part of the respective walls 61a and 61b; or (3) containing one or both of the plates 9 and 10 in the container interior. The light source 8 is chosen to emit a substantial portion of its electromagnetic radiation at or adjacent to the wavelength $\lambda_s$, where $\lambda_s$ is also a wavelength to which the phototransistor 11 is sensitive. The choice $\lambda_s = 0.93$ $\mu$m is suitable for transformer oil or Shelsol No. 72, either of which may be used for the viscous fluid 63. The presence of the viscous fluid 63 surrounding part or all of the weight 2 and/or the wire 7 (or shutter 12) insures that the wire 7 (or shutter 12) will undergo no oscillation or only damped oscillations around its equilibrium position so that the "true" error angle 8 for the wire 7 or shutter 12 is promptly attained. The pendulum or weight 2 may have dimensions of the order of 1 inch (length)$\times$0.2 inch (width)$\times$0.06 inch (thickness) and may be made of metal or a plastic such as acrylic. The walls 61a and 61b of the container 61 are preferably made of a plastic, such as acrylic, that is substantially transparent to light of wavelength $\lambda_s$ and is not attacked chemically by the viscous fluid 63 contained in the container 61.

Figure 11:
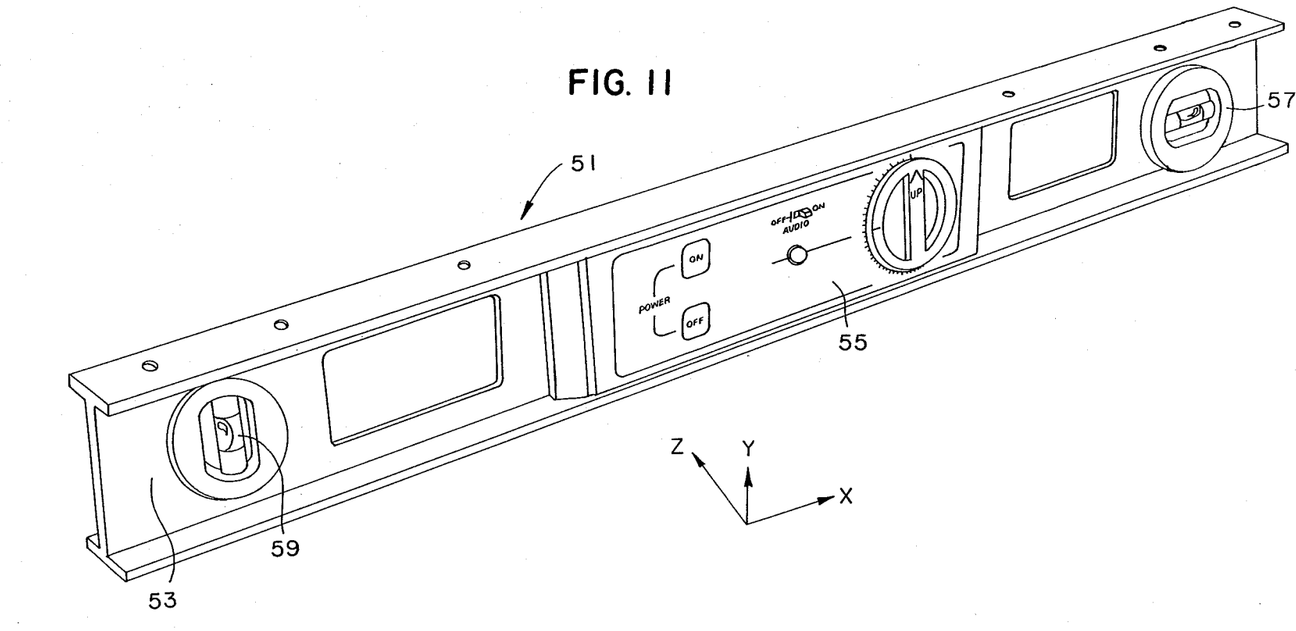
FIG. 11 is a perspective view of the exterior of one embodiment of the invention.

FIG. 11 illustrates the exterior of a device 51 incorporating the invention in one embodiment. The device 51 may comprise an I-beam structure 53 in which the mechanical/optical and electronic components are incorporated in a central portion 55 of the device. The device 51 may, optionally, include a horizontally oriented carpenter's level 57 and the device 51 may, optionally, include a vertically oriented carpenter's level 59, to indicate approximately a desired angular orientation.

Although the preferred embodiment of the invention has been shown and described herein, variation and modification of the mechanical/optical components and the electrical components may be made without departing from the scope of the invention.

We claim:

1. An electronic level comprising:
   light-producing means for producing light;
   light-responsive means, responsive to receipt of light, for producing a first electronic signal representing the amount of light from the light-producing means that strikes the light responsive means;
   light-interrupting means suspended from a structure and capable of rotating about a first axis, for preventing at least a portion of the light produced by the light-producing means from striking the light-responsive means, with the light-interrupting means being arranged such that the amount of light from the light-producing means that strikes the light-responsive means is a measure of the error angle between a predetermined line on the light-interrupting means sand a second predetermined line in a predetermined substantially vertical plane that is substantially perpendicular to the first axis; and
   signal means perceptible to a user including electronic means to receive said first electronic signal from said light-responsive means to produce an intermittent audio signal or an intermittent visual signal with a modulation frequency that varies substantially continuously and substantially montonically with increase in the magnitude of the error angle;
   wherein said light-interrupting means includes a suspension means to suspend a weighted object from said structure so that, when said structure is oriented such that said error angle is zero, the suspension means maximally or completely blocks the light that would otherwise strike such light responsive means; and wherein said weighted object is free to rotate in said predetermined vertical plane but is substantially prevented from rotating in any plane that is not parallel to said predetermined plane; wherein:
   the suspension means includes a thread tautly attached at its ends to two spaced apart points on the structure; and
   the weighted object has a width and is attached along the width to the thread.

2. An electronic level comprising:
   light-producing means for producing light;
   light-responsive means, responsive to receipt of light, for producing a first electronic signal representing the amount of light from the light-producing means that strikes the light-responsive means;
   light-interrupting means suspended from a structure and capable of rotating about a first axis, for preventing at least a portion of the light produced by the light-producing means from striking the light-responsive means, with the light-interrupting means being arranged such that the amount of light from the light-producing means that strikes the light-responsive means is a measure of the error angle between a predetermined line on the light-interrupting means and a second predetermined line in a predetermined substantially vertical plane that is substantially perpendicular to the first axis;
   signal means perceptible to a user and coupled to the light-responsive means for indicating by a variable signal the amplitude of the error angle; wherein the light-interrupting means includes:
    a thread tautly attached at its ends to two spaced apart points on the structure; and
    a weighted object having a width, wherein the weighted object is attached along the width to the thread, so that, when the structure is oriented such that said error angle is zero, the weighted object maximally or completely blocks the light that would otherwise strike the light-responsive means.

3. An electronic level according to claim 2, wherein said signal means includes electronic means to receive said first electronic signal from said light-responsive means to produce an intermittent audio signal or an intermittent visual signal with a modulation frequency that varies substantially continuously and substantially monotonically with increase in the magnitude of said error angle.

4. An electronic level according to claim 3, wherein said electronic means includes a piezoelectric speaker having an input terminal and an output terminal.

5. An electronic level according to claim 3, wherein said electronic means includes a light emitting diode having an input terminal and an output terminal.

6. An electronic level according to claim 3, wherein said electronic means includes a piezoelectric speaker having an input terminal and an output terminal and said electronic means includes a light emitting diode having an input terminal and an output terminal.

7. An electronic level according to claim 3, wherein said/signal means includes a substantially constant voltage source and a phototransistor with its emitter grounded and its collector electrically coupled through a resistor of predetermined resistance to the voltage source.

8. An electronic level according to claim 7, wherein said signal means further includes:
    a first comparator having at least two input terminals with its positive input terminal electrically connected to said phototransistor collector and its negative input terminal electrically connected through a second resistor of predetermined resistance to said voltage source, to produce a first comparator output signal;
    a second comparator having at least two input terminals with its positive input terminal electrically connected to said phototransistor collector, with its negative input terminal electrically connected through a third resistor of predetermined resistance to the negative input terminal of the first comparator and with the negative input terminal of the second comparator grounded through a fourth resistor of predetermined resistance, to produce a second comparator output signal;
    a voltage-controlled oscillator with its input terminal electrically connected to said phototransistor collector to produce an output oscillatory signal whose frequency varies monotonically as the input voltage increases;
    a first transistor with its emitter grounded and its base electrically connected through a fifth resistor of predetermined resistance to the output terminal of the second comparator; and
    a second transistor with its emitter electrically connected to the collector of the first transistor and its base electrically connected through a sixth resistor of predetermined resistance to the output terminal of the first comparator and its base electrically connected through a seventh resistor of predetermined resistance to the output terminal of the voltage-controlled oscillator.

9. An electronic level according to claim 8, wherein said signal means further includes:
    audio signal producing means having at least two terminals, with one terminal electrically connected to said collector of said second transistor and with a second terminal being directly or indirectly connected to said voltage source.

10. An electronic level according to claim 8, wherein a light-emitting diode having at least two terminals, with one terminal electrically connected to said collector of said second transistor; and
    an eighth resistor of predetermined resistance with one terminal electrically connected to a second terminal of the light-emitting diode and with a second terminal of the eighth resistor being directly or indirectly connected to said voltage source.

11. An electronic level according to claim 8, wherein at least one of said second resistor, said third/resistor and said fourth resistor is a potentiometer.

12. An electronic level according to claim 7, wherein said signal means further includes:
    a first comparator having at least two input terminals with its positive input terminal electrically connected to said phototransistor collector and its negative input terminal electrically connected through a second resistor of predetermined resistance to ground, to produce a first comparator output signal;
    a second comparator having at least two input terminals with its positive input terminal electrically connected to said phototransistor collector, with its negative input terminal electrically connected through a third resistor of predetermined resistance to the negative input terminal of the first comparator and with the negative input terminal of the second comparator electrically connected through a fourth resistor of predetermined resistance to said voltage source, to produce a second comparator output signal;
    a voltage-controlled oscillator with its input terminal electrically connected to said phototransistor collector to produce an output oscillatory signal whose frequency varies monotonically as the input voltage increases;
    a first transistor with its emitter electrically connected to said voltage source and its base electrically connected through a fifth resistor of predetermined resistance to the output terminal of the second comparator; and
    a second transistor with its emitter electrically connected to the collector of the first transistor and its base electrically connected through a sixth resistor of predetermined resistance to the output terminal of the first comparator and its base electrically connected through a seventh resistor of predetermined resistance to the output terminal of the voltage-controlled oscillator.

13. An electronic level according to claim 12, wherein said signal means further includes:
    audio signal producing means having at least two terminals, with one terminal electrically connected to said collector of said second transistor and with a second terminal being grounded.

14. An electronic level according to claim 12, wherein said signal means further includes:
   a light-emitting diode having at least two terminals, with one terminal electrically connected to said collector of said second transistor; and
   an eighth resistor of predetermined resistance, with one terminal electrically connected to a second terminal of the light-emitting diode and with a second terminal of the eighth resistor being grounded.

15. An electronic level according to claim 12, wherein at least one of said second resistor, said third resistor and said fourth resistor is a potentiometer.

* * * * *